R. B. TAYLOR.

SHINGLE-PACKER.

No. 6,742. Reissued Nov. 16, 1875.

Witnesses:
Jno W Hawley
O. H. Adix.

Inventor:
Robert B Taylor.
By G. L. Chapin, Atty.

N. PETERS, PHOTO-LITHOGRAPHER, WASHINGTON, D. C.

UNITED STATES PATENT OFFICE.

ROBERT B. TAYLOR, OF OCONTO, WISCONSIN.

IMPROVEMENT IN SHINGLE-PACKERS.

Specification forming part of Letters Patent No. 98,123, dated December 21, 1869; reissue No. 6,742, dated November 16, 1875; application filed July 22, 1875.

DIVISION B.

*To all whom it may concern:*

Be it known that I, ROBERT B. TAYLOR, of Oconto, in the county of Oconto and State of Wisconsin, have invented a new and useful Improvement in Shingle-Packers, of which the following is a specification:

The present invention relates to improvements in mechanism for bunching and clamping bunches of shingles for binding them with strap-iron. Its nature consists in the combination of a packing-bed, stationary end guide, and hinged end guide for squaring the butts of the bunch, and allowing a bunch to be removed from the packing-bed, and clamps and levers for drawing the bunch together or compressing it, as hereinafter described and shown.

Figure 1:
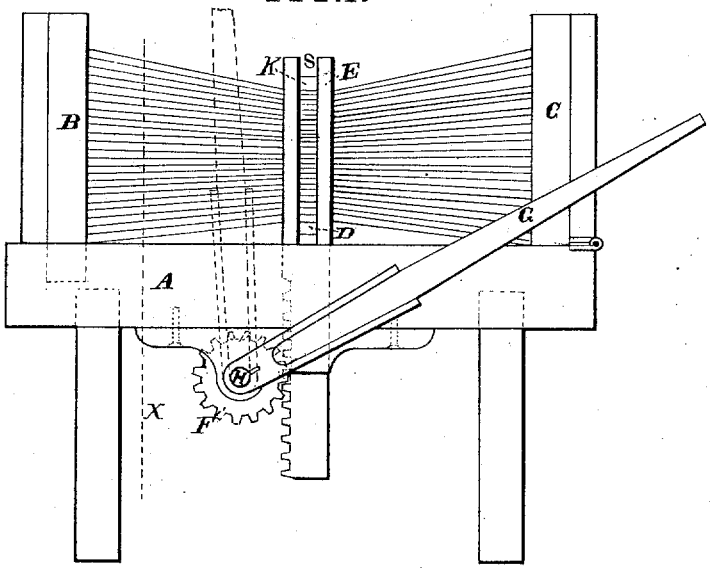
Figure 2:
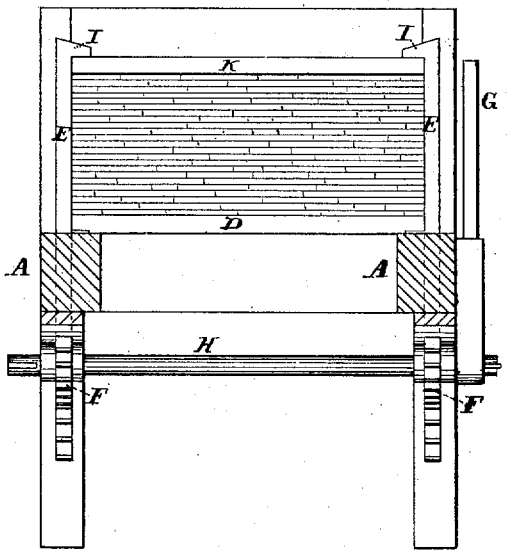

In the drawings, Figure 1 is a longitudinal elevation of my improvement in shingle-packers, a bunch of shingles being represented as compressed thereon. Fig. 2 is a transverse sectional elevation of the same taken on line *x*, Fig. 1.

A represents a table, of suitable strength and size to support a bunch of shingles and the mechanism for pressing them. B represents a stationary guide, projecting up at one end of the table or bed A; and C represents a guide, hinged to the other end of the table A. These guides are located such a distance apart as to correspond to the length of the bunch of shingles to be packed; and the object of the hinging of the guide C is that it may be swung down for the removal of the bunch. The inner face sides of the guides are recessed or countersunk for the forming edge guides for squaring the ends of the bunch.

The devices for clamping the middle of the bunch for strapping consist of two draw-bars, E, which are provided with inwardly-projecting lugs I I, for hooking onto the ends of the bands K, and with racks H′ at their lower ends for engaging a pinion, F, for drawing the bars E down by means of a lever, G.

I do not, however, claim the construction of the draw-bars E in this specification, but confine myself to the combination of the parts forming a complete machine.

To use my device, a band, D, with iron straps nailed to the under sides of the ends, is placed transversely on the table A, and the central part of the bunch is laid thereon, the butt-ends of the shingles coming against guides B C. When the bunch is full, an upper band, K, is placed transversely thereon, after which the lever G is brought down, engaging the lugs I with the ends of band K on both sides of the bunch, and bringing the clamps E, by means of pinions F and shaft H, so far as required, to compact the shingles. The bunch is removed after swinging outwardly the guide and releasing the lever G.

I claim, and desire to secure by Letters Patent of the United States—

The stationary guide B, hinged guide C, bed or table A, clamps E, in combination with lever G, pinions F, and shaft H, as set forth.

ROBERT B. TAYLOR.

Witnesses:
G. L. CHAPIN,
O. H. ADIX.